United States Patent
Sripada et al.

(10) Patent No.: US 12,406,127 B2
(45) Date of Patent: Sep. 2, 2025

(54) STATIC TIMING ANALYSIS OF MULTI-DIE THREE-DIMENSIONAL INTEGRATED CIRCUITS

(71) Applicant: Synopsys, Inc., Mountain View, CA (US)

(72) Inventors: Subramanyam Sripada, Portland, OR (US); Song Chen, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 788 days.

(21) Appl. No.: 17/705,145

(22) Filed: Mar. 25, 2022

(65) Prior Publication Data

US 2023/0306180 A1 Sep. 28, 2023

(51) Int. Cl.
*G06F 30/398* (2020.01)
*G06F 1/12* (2006.01)

(52) U.S. Cl.
CPC .............. *G06F 30/398* (2020.01); *G06F 1/12* (2013.01)

(58) Field of Classification Search
CPC ................................ G06F 30/398; G06F 1/12
USPC ......................................................... 716/113
See application file for complete search history.

(56) References Cited

U.S. PATENT DOCUMENTS

| | | | |
|---|---|---|---|
| 8,627,262 B2 | 1/2014 | Sripada et al. | |
| 8,762,908 B1 | 6/2014 | Chang et al. | |
| 9,754,069 B2 | 9/2017 | Wu et al. | |
| 10,146,897 B1 | 12/2018 | Sunder et al. | |
| 10,713,406 B2 * | 7/2020 | Kahng | G06F 30/394 |
| 10,747,929 B1 * | 8/2020 | Fraisse | G06F 30/36 |
| 11,961,823 B1 * | 4/2024 | Jain | H01L 25/0657 |
| 2011/0307850 A1 | 12/2011 | Dartu et al. | |
| 2015/0206824 A1 * | 7/2015 | Ramachandra | G11C 16/06 365/185.23 |
| 2017/0109468 A1 * | 4/2017 | Wu | G06F 30/3312 |
| 2018/0259581 A1 * | 9/2018 | Li | H10D 88/00 |
| 2018/0341738 A1 * | 11/2018 | Kahng | G06F 30/394 |

OTHER PUBLICATIONS

Han, K. et al. "Improved Performance of 3DIC Implementations Through Inherent Awareness of Mix-and-Match Die Stacking," Design, Automation & Test in Europe Conference & Exhibition, Mar. 14, 2016, pp. 61-66.

(Continued)

*Primary Examiner* — Jack Chiang
*Assistant Examiner* — Suchin Parihar
(74) *Attorney, Agent, or Firm* — Fenwick & West LLP (57) ABSTRACT

A system performs timing analysis of three-dimensional integrated circuits (3DICs). The circuit design is targeted for implementation on a stacked die that has a plurality of dies. The circuit design includes portions of the circuit design, each portion of the targeted for a different die. The system selects a net that crosses die boundaries and determines a plurality of sets of timing values of the net. The system determines a worst case slack value for the net based on the sets of timing values. The system determines a timing adjustment value for the net based on aggregate timing values determined from the sets of timing values. The system adjusts the worst case slack value for a net based on the timing adjustment value for each load pin of the net. The adjustment of the worst case slack reduces pessimism of the worst case slack value.

20 Claims, 8 Drawing Sheets

(56) References Cited

OTHER PUBLICATIONS

Lin, C.T. et al. "3-D Centric Technology and Realization with TSV," Proceedings of Technical Program of 2012 VLSI Design, Automation and Test, Apr. 23-25, 2012, pp. 1-4.
Panth, S. et al. "Probe-Pad Placement for Prebond Test Of 3-D ICs," IEEE Transactions on Components, Packaging and Manufacturing Technology, vol. 6. No. 4, Apr. 1, 2016, pp. 637-644.
Park, J. "3D-IC Design Challenges and Requirements," Cadence Design Systems, Oct. 27, 2021, pp. 1-7.
PCT International Search Report and Written Opinion, PCT Application No. PCT/US2023/014735, Jun. 7, 2023, 12 pages.
Semiconductor Engineering, "Multi-Corner Multi-Mode (MCMM) Analysis," Semiconductor Engineering: Deep Insights for the Tech Industry, 2 pages, Apr. 7, 2015, [Online] [Retrieved Oct. 5, 2023], Retrieved from the internet <URL:https://semiengineering.com/knowledge_centers/eda-design/methodologies-and-flows/multi-corner-multi-mode-analysis/>.

* cited by examiner

STATIC TIMING ANALYSIS OF MULTI-DIE THREE-DIMENSIONAL INTEGRATED CIRCUITS

TECHNICAL FIELD

The present disclosure relates generally to an electronic design automation (EDA) system for designing and verifying circuit design. In particular, the present disclosure relates to a system and method for providing static timing analysis of multi-die three-dimensional integrated circuits.

BACKGROUND

A circuit is analyzed for variations of fabrication parameters used in applying an integrated circuit design to a semiconductor wafer. A corner is a set of circuit design, process parameter, including the variation of those parameters, including voltage for each power domain, operating temperature, process parameter, interconnect parasitics and so on. These parameters include for example, a voltage parameter, a temperature parameter, a process parameter, and an interconnect parasitic parameter. A system typically analyzes the circuit to determine whether the circuit will function correctly at extremes of these parameters. A circuit running on devices fabricated at these extreme parameters may run slower or faster than specified at normal parameters. However, the circuit is analyzed and tested to ensure that the circuit does not fail to function at these process extremes.

Electronic circuits are being manufactured using three-dimensional integrated circuit (3DIC) technology that stacks silicon wafers or dies and interconnects them vertically, for example, using through-silicon vias (TSVs). The 3DIC technology allows integrating much larger number of components in an integrated circuit as compared to an integrated circuit implemented on a single-die. The use of stacked dies increases the number of parameter variations that need to be analyzed. This results in significant increase in processing time of analysis such as static timing analysis (STA) performed for 3DICs.

SUMMARY

The above and other issues are addressed by a computer-implemented method, computer system, and computer program product for performing timing analysis of three-dimensional integrated circuits (3DICs). The system receives a circuit design targeted for implementation on a stacked die that has a plurality of dies. The circuit design includes portions that are targeted for different dies. The system selects a first portion of the circuit design targeted for implementation on a first die and a second portion of the circuit design targeted for implementation on a second die. The circuit design includes a set of nets that cross die boundaries, such that a net has a first timing node in the first portion of the circuit design and a second timing node in the second portion of the circuit design.

The system selects a logical net along with its driver pins and load pins that crosses die boundaries and performs the following steps. The system determines a plurality of sets of timing values of the net, each set of timing values corresponding to one particular combination of the corners associated with each die that the net crosses. The system determines a worst case slack value for each load pin of the net based on the sets of timing values. The system determines a timing adjustment value for load pin of the net based on aggregate timing values determined from the sets of timing values. As the timing values are propagated to timing endpoints and worst case slack is computed, the system adjusts the worst case slack-value based on the timing adjustment value for the specific load pin of the net. The adjustment of the worst case slack reduces pessimism of the worst case slack value.

In an embodiment, the system determines the timing adjustment value by performing the following steps. The system determines a worst case slack value based on the sets of timing values for each load pin of the net. The system determines an aggregate slack value for each load pin of the net from the sets of timing values. The system determines the timing adjustment value as a difference between the worst case slack value for the load pin of the net and the aggregate slack value for the same pin.

In an embodiment, the worst case slack value is determined based on a minimum of a sum of (1) the CRP (clock reconvergence pessimism) value and (2) a difference of the data arrival value and the clock latency value determined for the plurality of sets of timing values. The aggregate slack value is determined based on a sum of (1) a minimum CRP value and (2) a difference of a maximum data arrival value and a minimum clock latency value determined across the plurality of sets of timing values.

The features and advantages described in this summary and the following detailed description are not all-inclusive. Many additional features and advantages will be apparent to one of ordinary skill in the art in view of the drawings, specification, and claims hereof.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

DETAILED DESCRIPTION

Circuit designers perform static timing analysis of various combinations of corners for implementation and sign-off of circuit designs. For examples, circuits are analyzed for different corners of process, voltage, temperature (PVT), and resistance-capacitance (RC) corners since these parameters affect timing delays of paths of the circuit.

Use of 3DIC (three-dimensional integrated circuit) increases the number of corners that are analyzed for the circuit. A 3DIC may also be referred to as a stacked die integrated circuit. A die is a block of semiconducting material on which a circuit or a portion of a circuit is fabricated. Integrated circuits are produced in large batches on a single wafer, for example, a semiconductor wafer. The wafer is cut (diced) into many pieces, each containing one copy of the circuit or a portion of the circuit. Each of these pieces is called a die. The timing of the 3DIC is analyzed using a circuit design that includes multiple portions of the circuit design such that each portion of the circuit design is implemented using a different die from the stacked die.

For a single die circuit, the timing analysis may be performed for various combinations of corners. For example, if there are N1 process corners, N2 voltage corners, N3 temperature corners, and N4 RC corners, the timing analysis is performed for N1×N2×N3×N4 combinations of corners. In this example, N1, N2, . . . , N4 are all positive integers. These runs may be executed in a distributed fashion across multiple processors. For single die circuits, the entire die is run as a single corner, i.e., the particular values of process, voltage, temperature, and RC.

Embodiments improve the efficiency of performing the timing analysis by reducing the complexity of the analysis to a linear function of the number of corners per die. Accordingly, a single run can solve for multiple corners of the different dies. As a result, embodiments disclosed improve the time complexity of execution of the timing analysis process, for example, static timing analysis time complexity for a multi-die circuit using S dies and N corners per die, from $O(N^S)$ to $O(N)$. Execution of $O(N^S)$ runs could take huge amount of processing power and memory and may take several days to run for large circuits. In contrast, the techniques disclosed reduce the amount of processing power and memory required as well as the time taken to execute the runs of the timing analysis.

An electronic circuit can be represented as a circuit configuration having a description of the components of the circuit and the connections between the circuits specified as netlists and a representation of the timing constraints for the circuit. A corner may correspond to a combination of parameters describing operation of the electronic circuit, for example, process, voltage, temperature and interconnect parasitics at which the electronic circuit is operated. These parameters affect the timing delays of various paths in the electronic circuit.

Electronic circuits are analyzed to determine whether there are timing violations at various timing nodes corresponding to the parameters of a particular corner. A timing node may also be referred to as a timing endpoint and represents a point along a timing path. The delay caused by each component of the electronic circuit for a given set of parameters may be obtained by invoking a circuit cell library. These delays caused by various components are used to determine overall delays across various paths of the electronic circuit.

The analysis of the electronic circuit determines timing delays associated with various timing nodes of the electronic circuit including the arrival time, required time, and slack for various timing nodes of the electronic circuit. The slack at a timing node corresponds to the difference between the required time and the arrival time at the timing node. The slack value can be computed for various timing nodes of the circuit for a scenario to determine whether there are any violations. For example, if the arrival time is greater than the required time for a timing node, the signal at the timing node arrives later than the required time. Accordingly, the slack value at the timing node is negative and corresponds to a timing violation (a timing violation is also referred to herein as a "violation").

Figure 1:
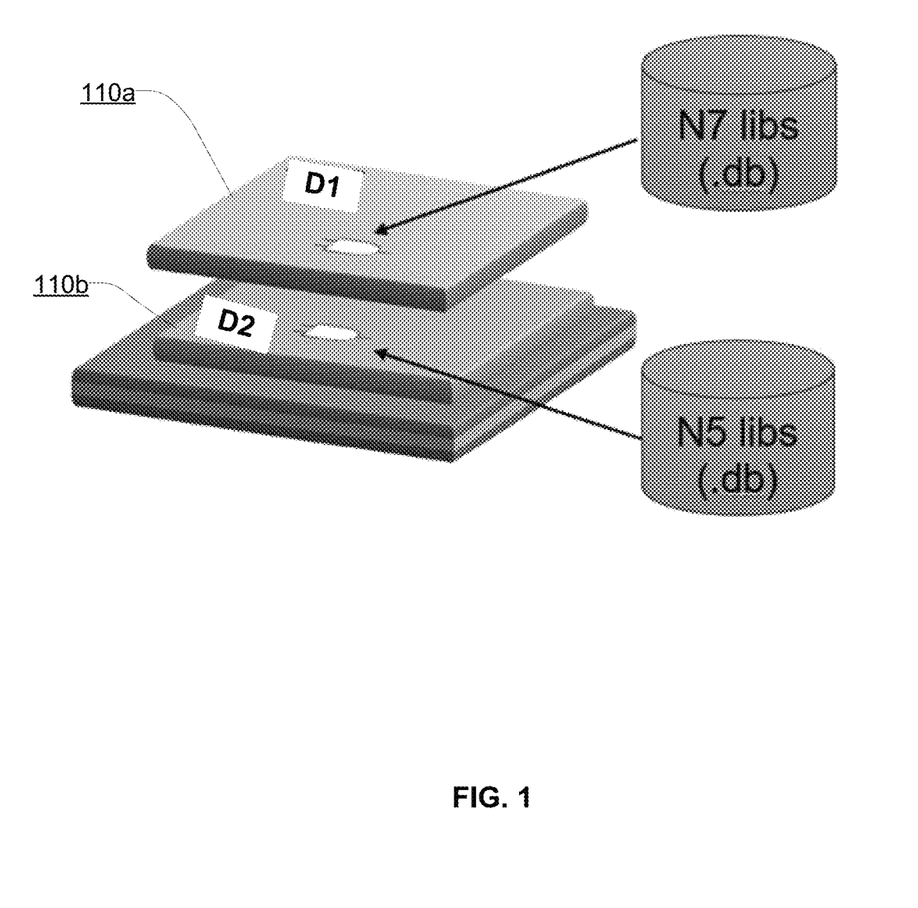
FIG. 1 shows an example 3DIC with two dies using different processes, in accordance with an embodiment.

FIG. 1 shows an example 3DIC with two dies using different processes, according to an embodiment. Figure (FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g., "110" in the text refers to reference numerals "110a" and/or "110b" in the figures).

The portion of the integrated circuit implemented on die 110a uses 7 nanometer (nm) process technology (N7) whereas the portion of the integrated circuit implemented on die 110b uses 5 nm process technology (N5). Accordingly, the portions of the integrated circuit in different dies have to be analyzed for different process variations. Similarly, the portions of the integrated circuits on different dies have to be analyzed for other corners such as voltage corners, temperature corners, and RC corners.

Figure 2A:
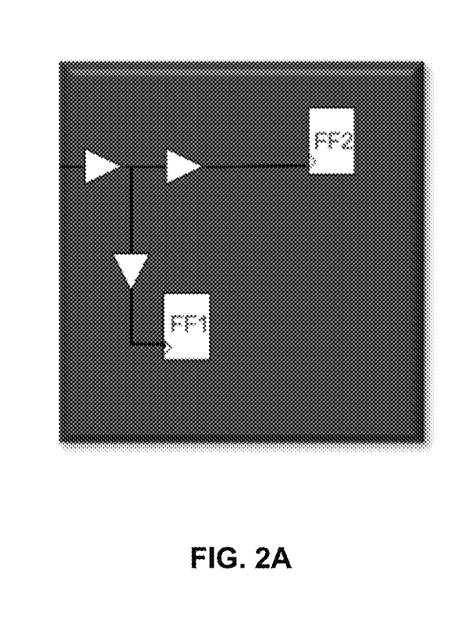
FIG. 2A illustrates an integrated circuit based on a single die, in accordance with an embodiment.

FIG. 2A illustrates an integrated circuit based on a single die, in accordance with an embodiment. The circuit shown includes components such as FF1 and FF2 and interconnections between components. The timing analysis may be performed for various paths in the circuit, for example, timing paths from component FF1 to component FF2. The use of 3DIC technology introduces cross-die timing paths, as described in FIG. 2B.

Figure 2B:
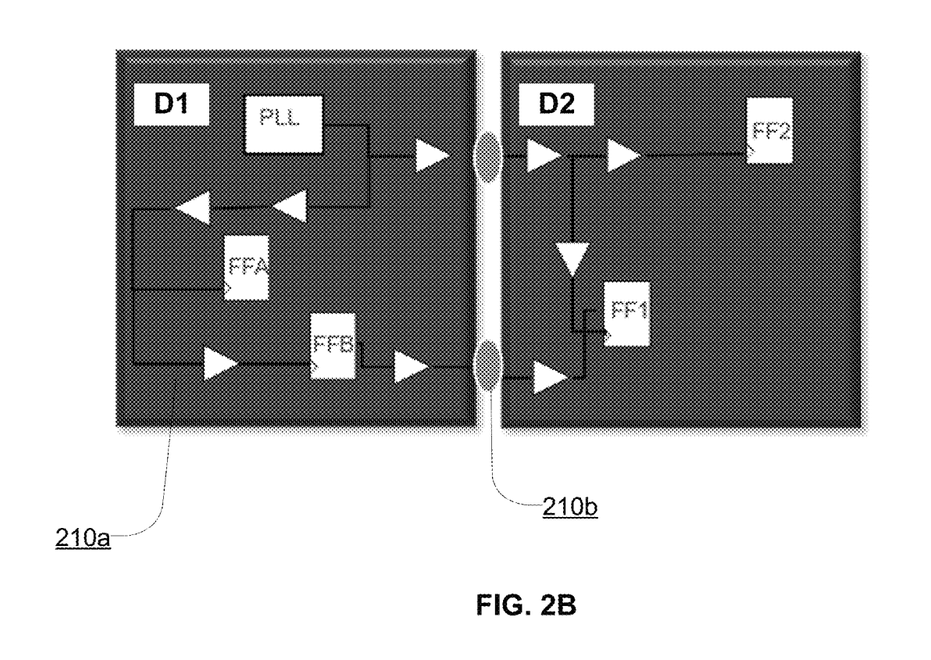
FIG. 2B illustrates an integrated circuit based on two dies, in accordance with an embodiment.

FIG. 2B illustrates an integrated circuit based on two dies, in accordance with an embodiment. The portion of circuit C1 implemented using die D1 includes components FFA, FFB, PLL, and buffers. The portion of circuit C2 implemented using die D2 includes components FF1, FF2, and buffers. The circuit is analyzed for timing paths that are within a single die, for example, a timing path from FFA to FFB 210a. There are cross-die timing paths introduced, for example, a timing path 210b from FFB to FF1. Each die may have its own corner, for example, each die may be manufactured by a different technology and therefore have a different corner. For example, die D1 may use 7 nm technology whereas die D2 may use 5 nm technology as illustrated in FIG. 1.

Each portion of the circuit in a die is analyzed for different process corners. Accordingly, die D1 may be analyzed for a corner C1 and die D2 may be analyzed for a corner C2. Accordingly for timing paths that cross die boundaries, the number of times the timing analysis is performed in M1×M2 where M1 is the number of corners of die D1 and M2 is the number of corners of die D2. The number of dies can be more, for example, a circuit may have 12 dies stacked on top of each other. Accordingly, the timing analysis may have to be performed for a number of times obtained by taking the products of the number of corners of each die. This is a highly computation intensive operation.

The timing analysis of the circuit may determine timing slacks for various timing paths. The timing slack refers to the difference between actual or achieved time and the desired time for a timing path. The timing analysis determines whether timing slacks are negative or positive. The results of timing analysis affect the sign off process. If timing slacks are negative, the circuit design may have to be modified until all timing slacks are positive after which the circuit design may be signed off for manufacturing.

Figure 3:
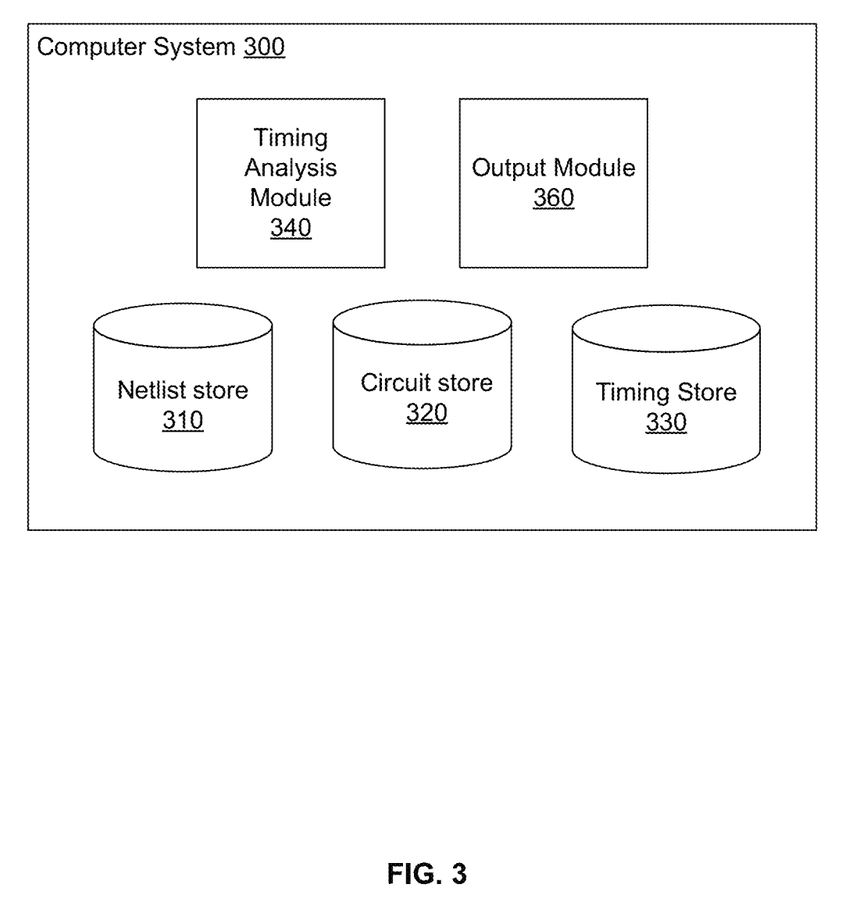
FIG. 3 is a system architecture diagram showing various modules of a computing system for performing timing analysis, according to one embodiment.

FIG. 3 is a system architecture diagram showing various modules of a computing system for performing timing analysis, according to one embodiment. The computing system 300 includes modules including a netlist store 310, a circuit store 320, a timing store 330, a timing analysis module 340, and an output module 360. In an embodiment, the computing system 300 is implemented as a computing device illustrated in FIG. 8. The various modules, for example, timing analysis module 340 and output module 360 illustrated in FIG. 3 are stored in the memory, for example, main memory 804. The data of the stores such as netlist store 310, circuit store 320, and timing store 330 may be stored in secondary storage, for example, data storage device 818 and loaded in memory, for example, main memory 804 for processing. The instructions of the modules are executed by the processing device 802. In other embodiments, the computing system 300 may include additional, fewer, or different modules for various applications. The modules and stores may be combined in different combinations, without deviating from the scope of the present disclosure. Components such as network interfaces, security mechanisms, load balancers, failover servers, management and network operations consoles, and the like are not shown so as to not obscure the details of the system.

The circuit store 320 stores a description of the circuit being analyzed such as a netlist. In an embodiment, the circuit store 320 may represent the circuit using a graph representation in which the nodes correspond to various components of the circuit and the edges correspond to the connections between the circuits. The output module 360 sends results of timing analysis of the circuit, for example, information describing any timing violations for presentation to a user.

The timing analysis module 340 performs timing analysis of various nets of the circuit being analyzed. In an embodiment, the timing analysis module 340 determines the delay of a cell by querying or looking up timing store 330 with information identifying the input waveform. The timing analysis module 340 receives a delay value from the timing store 330 based on the information identifying the input waveform. For instance, the timing analysis module 340 receives a delay value from the timing store 330 based on the transition time of the input waveform.

In an embodiment, the timing analysis module 340 determines a timing adjustment value to be added to the slack of a net that crosses die boundaries. The timing adjustment value removes pessimism added to the timing slack as a result of making worst case assumptions about arrivals and clock latency values. The timing analysis module 340 stores the timing adjustment value in association with the nets in a data structure, for example, a table mapping nets with the timing adjustment value. During the design and/or optimization of the circuit, the timing adjustment values may be accessed from the table structure and applied to the estimates of slacks of the nets. The timing adjustment value may also be referred to as timing credit.

Figure 4:
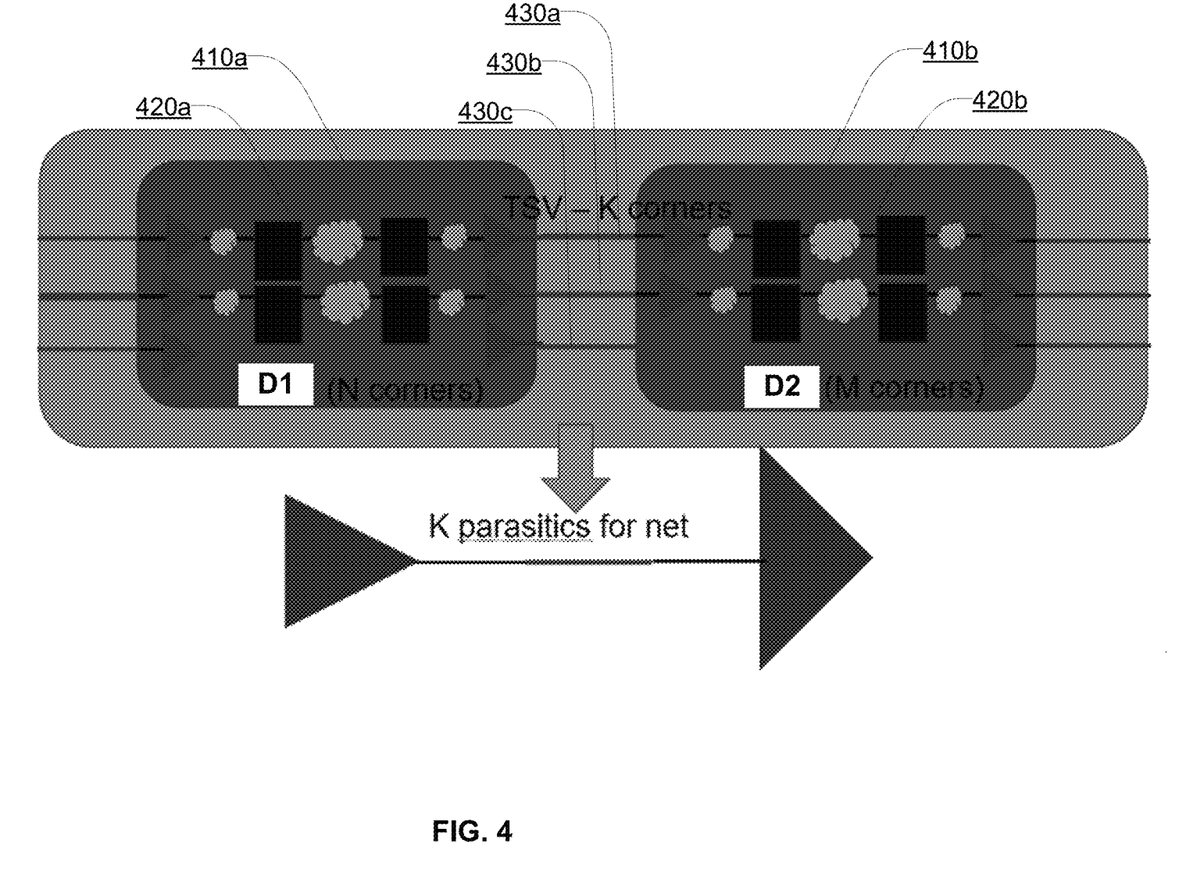
FIG. 4 shows examples of nets that cross die boundaries, in accordance with an embodiment.

FIG. 4 shows examples of nets that cross die boundaries, in accordance with an embodiment. The circuit design shown in FIG. 4 is targeted for implementation on a stacked die including a plurality of dies. The figure shows two dies D1 410a and D2 410b. The circuit design includes multiple portions, each portion targeted for implementation on a particular die. For example, circuit portion 420a is targeted for implementation on die D1 and circuit portion 420b is targeted for implementation on die D2. The portion of circuit C1 targeted for implementation on die D1 is associated with N number of corners and the portion of circuit C2 targeted for implementation on die D2 is associated with M number of corners. The nets that lie within a single die Dn and do not cross die boundaries are analyzed for the number of corners for the die Dn, where n is a die number. For example, if a net lies within die D1, it is analyzed only for N corners and if a net lies within die D2, it is analyzed only for M corners.

The nets 430a, 430b, 430c cross die boundaries. Accordingly, each of the nets 430 has a timing node in the portion of circuit 420a targeted for implementation on die D1 and another timing node in the portion of circuit 420b targeted for implementation on die D2. A net 430 has 3 net segments—a segment in die D1, a segment at top (i.e., the segment that crosses from die D1 to die D2), and a segment in die D2. The segments can have different number of parasitic corners—for example, "P1" parasitic corners in Die D1, "P2" parasitic corners in Die D2, "P3" parasitic corners in top. Accordingly, there are K=P1*P2*P3 representing the total number of RC corners to be analyzed for such net. Furthermore, each of the nets 430 is analyzed for K parasitics, i.e., K RC corners. Accordingly, the total number of corners for each net 430 that crosses die boundaries is N*M*K. The system analyzes each net 430 for N*M*K corners but reduces the results to M corners of die D2. Accordingly, the results of N*K corners for a net 430 are reduced to a single corner of die D2.

The set of corners considered for the net is $S_{corners}$ and the number of corners considered for the net is determined as $N_{corners}=N*K$, where N is the number of corners of die D1 and K is the number of RC corners based on the parasitics for the net. The value $N_{corners}$ represents the cardinality of the set $S_{corners}$.

Figure 5:
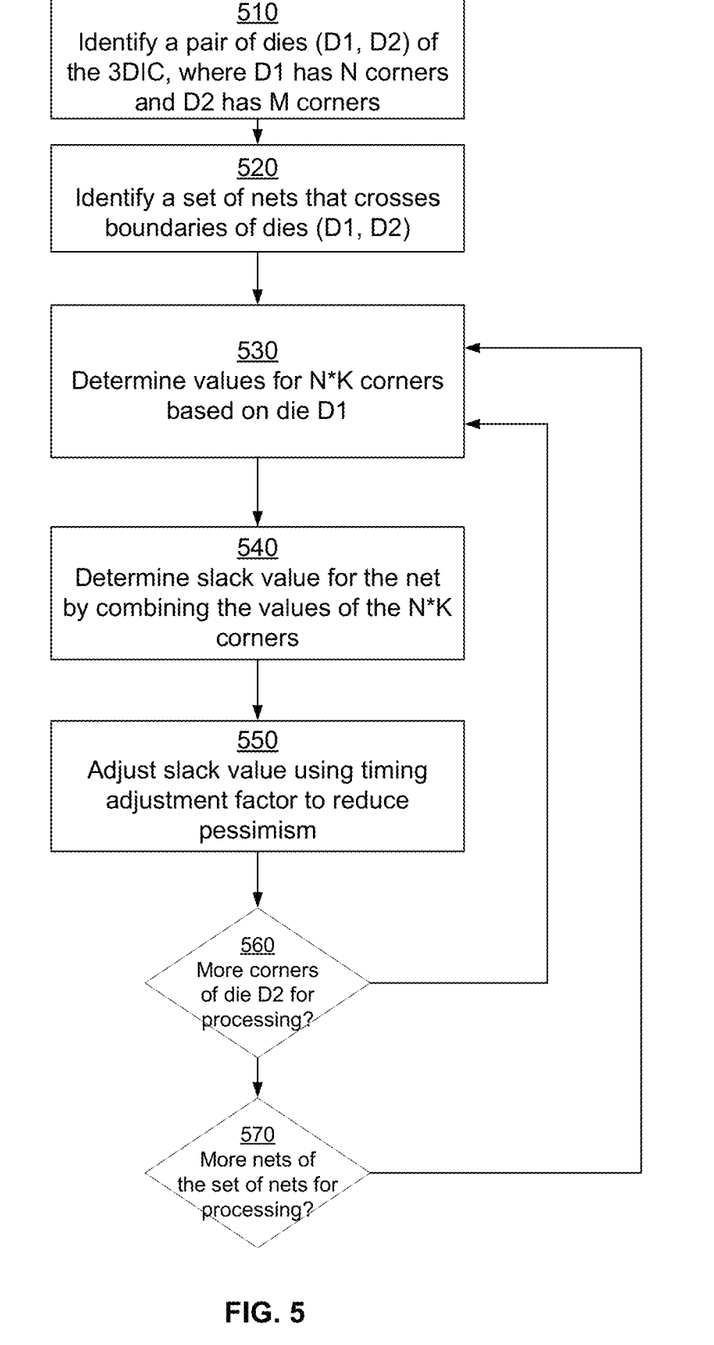
FIG. 5 shows a process illustrating timing analysis of multiple corners of a 3DIC, in accordance with an embodiment.

FIG. 5 shows a process illustrating timing analysis of multiple corners of a 3DIC, in accordance with an embodiment. The steps may be executed in an order different from that indicated in the flowchart. For example, certain steps may be executed in parallel.

At 510, the system identifies a pair of dies of the 3DIC, for example, a pair (D1, D2). The die D1 is assumed to have N corners and die D2 is assumed to have M corners. At 520, the system identifies a set of nets $S_{nets}$ such that each net from the set $S_{nets}$ crosses the die boundaries between dies D1 and D2.

The system repeats the steps 530, 540, and 550 for each net of the set $S_{nets}$ and for each corner of die D2. There are N*K corners of die D1 corresponding to each corner of die d2. At 530, the system determines the timing values for the net including data arrival values, clock values, and clock reconvergence pessimism (CRP) values for the N*K corners of die D1 corresponding to each corner of die D2. For constraints for which the worst case value is a minimum value over a set of possible values, the worst case constraint over the N*K corners is determined by taking the minimum of the minimum values across the N*K corners. Similarly, for constraints for which the worst case value is a maximum value over a set of possible values, the worst case constraint over the N*K corners is determined by taking the maximum of the maximum values across the N*K corners. However this introduces significant amount of pessimism due to worst case assumptions. Embodiments reduce the pessimism by adjusting the worst case values using a timing adjustment value. The CRP value represents a difference in delay along the common part of the launching and capturing clock paths. Launching path represents the clock path which is responsible for launching the data at a flip flop and capturing clock path is the clock path which is responsible for launching the data at a flip flop. At 540, the system determines a worst case slack value for the net by combining the data arrival values and clock latency values of the N*K corners as described in further details herein. For example, for setup time, the system determines the worst case setup slack value based on the worst case data arrival value and the best case (minimum) clock latency value for the net. The best case clock latency is determined as the minimum clock latency and the worst case data arrival value is determined as the maximum data arrival value across all corners of die D1 that are considered. According to an embodiment, the worst case setup slack is determined as the difference of the worst case data arrival value (i.e., maximum data arrival value) and the best case clock latency (i.e., minimum clock latency) for setup time. The worst case hold slack is determined as the difference of the best case data arrival value (i.e., minimum data arrival value) and the worst case clock latency (i.e., maximum clock latency) for the hold time. The system performs a check 560 if there are more corners of die D2 remaining and repeats the steps 530, 540, and 550 for each remaining corner of die D2. The system performs a check 570 if there are more nets of the set of cross die nets remaining and repeats the steps 530, 540, and 550 for each remaining net of the set of cross die nets.

The system further obtains the timing adjustment value. Details of the process for determining the timing adjustment value are shown in the process illustrated in FIG. 6. The system adjusts the worst case slack value based on the timing adjustment value. For example, the system adds a value based on the timing adjustment value to the worst case slack value. The system may add the timing adjustment value or a fraction of the timing adjustment value to the worst case slack value. This improves the worst case slack value and makes it less pessimistic.

Figure 6:
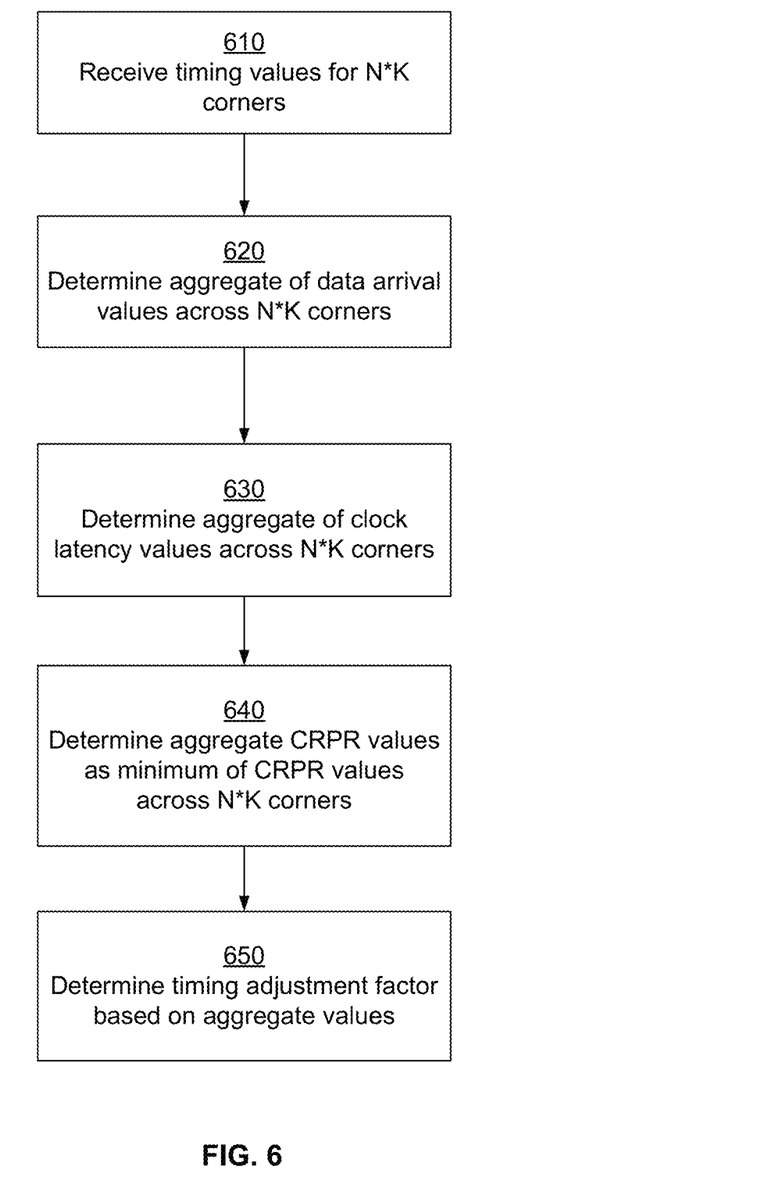
FIG. 6 illustrates the steps for determining a timing adjustment value, in accordance with an embodiment.

FIG. 6 illustrates the steps for determining a timing adjustment value, in accordance with an embodiment. The steps may be executed in an order different from that indicated in the flowchart. For example, certain steps may be executed in parallel.

At 610, the system receives timing values, for example, data arrival values, clock latency values, and CRP values for N*K corners for a net that crosses die boundaries. The clock latency represents the earliest time a clock signal is expected to arrive at a clock input port of the net. The data arrival represents the latest time a data signal is expected to arrive at the data input port of the net. The system determines various aggregate values as indicated in steps 620, 630, and 640. The aggregate values may also be referred to as merged values, for example, the aggregate clock latency may be referred to as the merged clock latency, the aggregate data arrival value referred to as the merged data arrival, and the aggregate CRP value referred to as the merged CRP value.

At 620, the system determines an aggregate data arrival value $A_{agg}$ by aggregating the data arrival value $A_i$ for each corner of the set of corners $S_{corners}$. For setup time, the aggregate data arrival is determined as the maximum data arrival value $A_i$ for each corner of the set of corners $S_{corners}$, i.e., the maximum data arrival value across $N_{corners}$ corners considered for the net. The determination of $A_{agg}$ for setup time is described using the following equation.

$$A_{agg} = \max(A_i), i=1 \ldots N_{corners} \quad (1)$$

For hold time, the aggregate data arrival is determined as the minimum data arrival value $A_i$ for each corner of the set of corners $S_{corners}$, i.e., the minimum data arrival value across $N_{corners}$ corners considered for the net. The determination of $A_{agg}$ for setup time is described using the following equation.

$$A_{agg} = \min(A_i), i=1 \ldots N_{corners} \quad (2)$$

At 630, the system determines an aggregate clock latency value $L_{agg}$ by aggregating the clock latency values across the set of cross die corners $S_{corners}$. For setup time, the aggregate clock latency value is determined as the minimum of clock latency value for the set of cross die corners $S_{corners}$, i.e., the minimum clock latency value across $N_{corners}$ cross die corners considered for the net. The determination of $L_{agg}$ for setup time is described using the following equation.

$$L_{agg} = \min(L_i), i=1 \ldots N_{corners} \quad (3)$$

For hold time, the aggregate clock latency value is determined as the maximum of clock latency value for the set of cross die corners $S_{corners}$, i.e., the maximum clock latency value across $N_{corners}$ cross die corners considered for the net. The determination of $L_{agg}$ for hold time is described using the following equation.

$$L_{agg} = \min(L_i), i=1 \ldots N_{corners} \quad (4)$$

At 640, the system determines an aggregate CRP value $C_{agg}$ as the minimum CRP value $C_i$ for the cross die corners of the set of cross die corners $S_{corners}$, i.e., the minimum CRP value $C_i$ across $N_{corners}$ cross die corners considered for the net. The determination of $C_{agg}$ is described using the following equation.

$$C_{agg} = \min(C_i), i=1 \ldots N_{corners} \quad (5)$$

The system determines an aggregate slack value as the difference between the aggregate data arrival value $A_{agg}$ and the aggregate clock latency value $L_{agg}$ across the cross die corners of the set of cross die corners $S_{corners}$.

In an embodiment, the estimate of the worst case slack is determined as the minimum difference of the data arrival and the clock latency, i.e., $\min(A_i - L_i)$ across the set of corners as determined by the following equation.

$$S_{worst} = \min(A_i - L_i + CRP) \quad (6)$$

In an embodiment, the aggregate slack is determined as the difference of the aggregate data arrival $A_{agg}$ and the aggregate clock latency $L_{agg}$, as determined by the following equation.

$$S_{agg} = A_{agg} - L_{agg} \quad (7)$$

At 650, the system determines 650 a timing adjustment value $T_{adjust}$ that is used for pessimism removal of slack values determined for nets that cross die boundaries. The timing adjustment value may be referred to as a timing credit value that is added to slack values determined for nets for removing pessimism introduced by making worst case assumptions while calculating the slack values. The timing adjustment value $T_{adjust}$ is determined for each load pin in die D2 of the net that crosses die boundary. A net connects one or more driver pins to load pins. A driver pin may be an output pin of a cell and the load pin may be an input pin of a cell. A load pin may also be referred to as the input pin of a cell receiving signal from the net. The timing adjustment value $T_{adjust}$ is determined based on an estimate of the worst case slack and an aggregate slack value. Accordingly, the time adjustment factor $T_{adjust}$ is determined as the difference of the worst case slack $S_{worst}$ and the aggregate slack value $S_{agg}$ using the following equation.

$$T_{adjust}=S_{worst}-S_{agg} \quad (6)$$

In an embodiment, the system determines an aggregate slack value based on the aggregate data arrival value $A_{agg}$, aggregate clock latency value $L_{agg}$, and the aggregate CRP value $C_{agg}$ across the cross die corners of the set of cross die corners $S_{corners}$. In an embodiment, the estimate of the worst case slack is determined as the minimum difference of the data arrival and the clock latency, i.e., $\min(A_i-L_i)$ across the set of cross die corners.

$$T_{adjust}=\min(A_i-L_i)-(A_{agg}-L_{agg}) \quad (7)$$

In an embodiment, the estimate of the worst case slack is determined as the minimum of the sum of the CRP value $C_i$ and the difference of the data arrival and the clock latency, i.e., $\min(A_i-L+C_i)$ across the set of cross die corners as determined by the following equation.

$$S_{worst}=\min(A_i-L_i+C_i) \quad (8)$$

Furthermore, the aggregate slack is determined as the sum of the CRP value $C_{agg}$ and difference of the aggregate data arrival $A_{agg}$ and the aggregate clock latency $L_{agg}$, as determined by the following equation.

$$S_{agg}=A_{agg}-L_{agg}+C_{agg} \quad (9)$$

Accordingly, the timing adjustment value is determined as follows.

$$T_{adjust}=\min(A_i-L_i+C_i)-(A_{agg}-L_{agg}+C_{agg}) \quad (10)$$

The timing adjustment value is added to slack values determined for the net that crosses die boundaries to reduce pessimism.

The use of accurate slack value allows the system to perform accurate timing analysis. For example, the sign-off is likely to performed at an earlier stage in the design based on an accurate timing analysis. Without use of the techniques disclosed the circuit design is likely to be rejected due to pessimistic timing analysis and as a result sent back for further modifications that may not be needed. This results in waste of computing resources as well as developer/designer resources. Accordingly, the techniques disclosed herein improve the efficiency of the circuit design process as well as improve the efficiency of computing resources used for performing the design processes.

Figure 7:
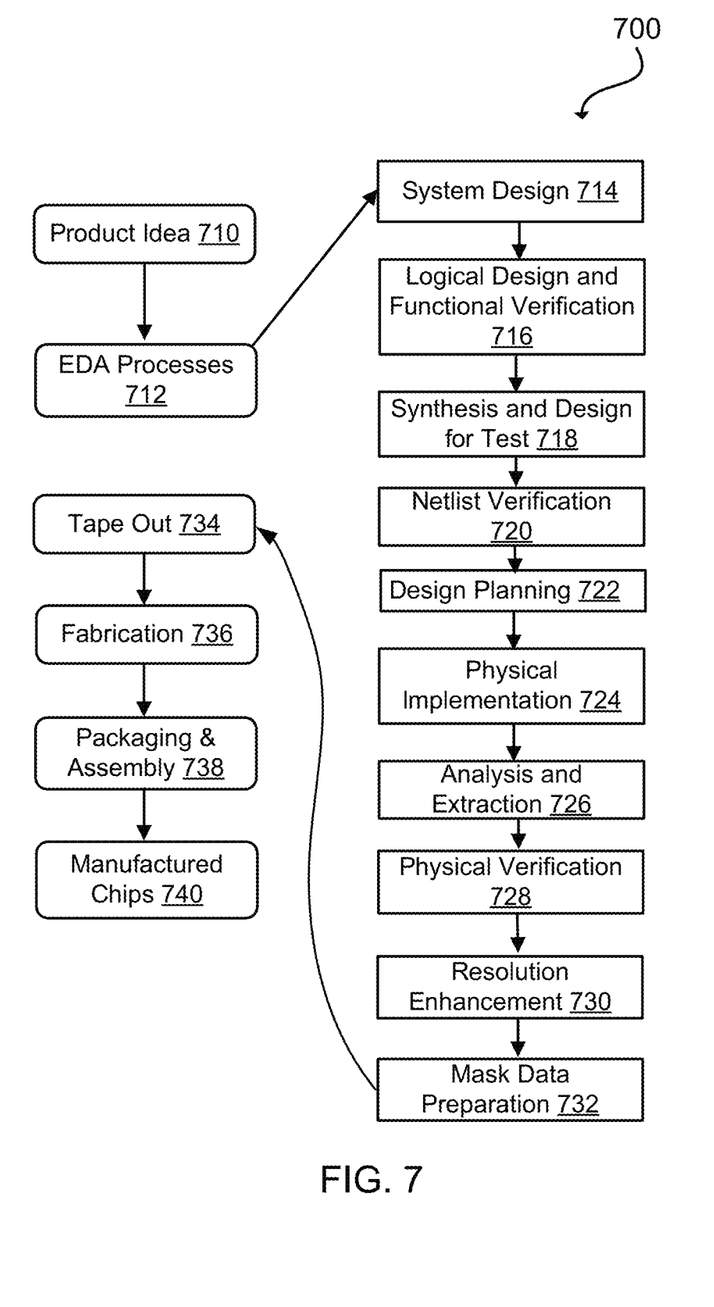
FIG. 7 illustrates an example set of processes used during the design, verification, and fabrication of an article of manufacture such as an integrated circuit to transform and verify design data and instructions that represent the integrated circuit.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
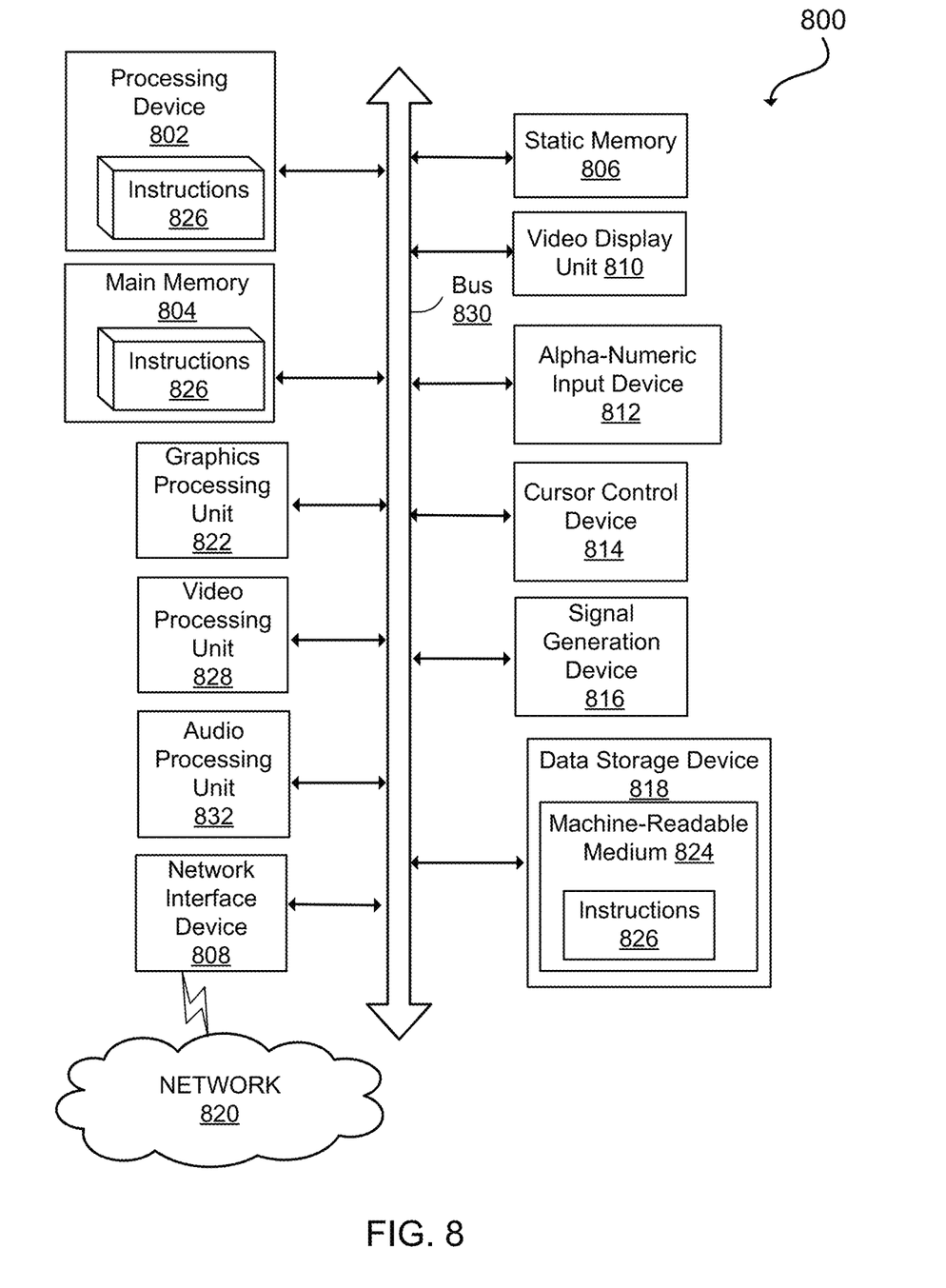
FIG. 8 illustrates an example machine of a computer system 800 within which a set of instructions, for causing the machine to perform any one or more of the methodologies discussed herein, may be executed.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer-implemented method for timing analysis of three-dimensional integrated circuits (3DICs), comprising:
    receiving a circuit design for a 3DIC, the circuit design targeted for implementation on a stacked die comprising a plurality of dies, the circuit design comprising a plurality of portions of the circuit design, each portion of the circuit design targeted for a die from the plurality of dies;
    selecting a first portion of the circuit design targeted for implementation on a first die and a second portion of the circuit design targeted for implementation on a second die, the circuit design including a set of nets that cross die boundaries, such that each net of the set of nets includes a first timing node in the first portion of the circuit design and a second timing node in the second portion of the circuit design;
    selecting a net from the set of nets that cross die boundaries, the net providing signal to one or more load pins;
    for each of a plurality of corners associated with the second die:
        determining a plurality of sets of timing values of the net, each set of timing values corresponding to a corner associated with the first die;
        determining a worst case slack value for the net based on the plurality of sets of timing values; and
        determining a timing adjustment value for each load pin of the net based on aggregate timing values determined from the plurality of sets of timing values; and
    adjusting the worst case slack value based on the timing adjustment value for the net to reduce pessimism of the worst case slack value.

2. The computer-implemented method of claim 1, wherein each set of timing values includes, a data arrival value, a clock latency value, and a clock reconvergence pessimism (CRP) value.

3. The computer-implemented method of claim 2, wherein determining the timing adjustment value comprises:
    determining a worst case slack value for each load pin of the net from the plurality of sets of timing values;
    determining an aggregate slack value for each load pin of the net from the plurality of sets of timing values;
    determining the timing adjustment value as a difference between the worst case slack value for the net and the aggregate slack value for the net.

4. The computer-implemented method of claim 3, wherein the worst case slack value is determined based on a minimum of a sum of (1) the CRP value and (2) a difference of the data arrival value and the clock latency value determined for the plurality of sets of timing values.

5. The computer-implemented method of claim 3, wherein the aggregate slack value is determined based on a sum of (1) a minimum CRP value and (2) a difference of a maximum data arrival value and a minimum clock latency value determined across the plurality of sets of timing values.

6. The computer-implemented method of claim 3, wherein the worst case slack value is determined based on a minimum of the difference of data arrival value and clock latency value determined for each set of timing values.

7. The computer-implemented method of claim 3, wherein the aggregate slack value represents an aggregate setup slack value determined based on a sum of the difference of a maximum data arrival value and a minimum clock latency value determined across the plurality of sets of timing values.

8. The computer-implemented method of claim 3, wherein the aggregate slack value represents an aggregate hold slack value determined based on a sum of the difference of a minimum data arrival value and a maximum clock latency value determined across the plurality of sets of timing values.

9. The computer-implemented method of claim 3, wherein adjusting the worst case slack value comprises adding the timing adjustment value to the worst case slack value.

10. A non-transitory computer readable storage medium storing instructions that when executed by a computer processor cause the computer processor to:

receive a circuit design for a 3DIC, the circuit design targeted for implementation on a stacked die comprising a plurality of dies;

select a first portion of the circuit design targeted for implementation on a first die and a second portion of the circuit design targeted for implementation on a second die, the circuit design including a set of nets that cross die boundaries;

select a net from the set of nets that cross die boundaries;

for each of a plurality of corners associated with the second die:

determine a plurality of sets of timing values of the net, each set of timing values corresponding to a corner associated with the first die;

determine a timing adjustment value for the net based on aggregate timing values determined from the plurality of sets of timing values; and adjust a worst case slack value for the selected net based on the timing adjustment value for the net to reduce pessimism of the worst case slack value.

11. The non-transitory computer readable storage medium of claim 10, wherein each set of timing values includes, a data arrival value, a clock latency value, and a clock reconvergence pessimism removal (CRP) value, wherein instructions for determining the timing adjustment value cause the computer processor to:

determine a worst case slack value for the net from the plurality of sets of timing values;

determine an aggregate slack value for the net from the plurality of sets of timing values;

determine the timing adjustment value as a difference between the worst case slack value for the net and the aggregate slack value for the net.

12. The non-transitory computer readable storage medium of claim 11, wherein the worst case slack value is determined based on a minimum of a sum of (1) the CRP value and (2) a difference of the data arrival value and the clock latency value determined for the plurality of sets of timing values.

13. The non-transitory computer readable storage medium of claim 11, wherein the aggregate slack value is determined based on a sum of (1) a minimum CRP value and (2) a difference of a maximum data arrival value and a minimum clock latency value determined across the plurality of sets of timing values.

14. The non-transitory computer readable storage medium of claim 11, wherein the worst case slack value is determined based on a minimum of the difference of data arrival value and clock latency value determined for each set of timing values.

15. A computer-implemented system comprising:
a computer processor; and a non-transitory computer readable storage medium storing instructions that when executed by a computer processor cause the computer processor to:

receive a circuit design for a 3DIC, the circuit design targeted for implementation on a stacked die comprising a plurality of dies;

select a first portion of the circuit design targeted for implementation on a first die and a second portion of the circuit design targeted for implementation on a second die, the circuit design including a set of nets that cross die boundaries;

for each net selected from the set of nets and for each of a plurality of corners associated with the second die:

determine a plurality of sets of timing values of the selected net, each set of timing values corresponding to a corner associated with the first die;

determine a timing adjustment value for the net based on aggregate timing values determined from the plurality of sets of timing values; and adjust a worst case slack value for a load pin of the net based on the timing adjustment value for each load pin of the net to reduce pessimism of the worst case slack value.

16. The computer system of claim 15, wherein each set of timing values includes, a data arrival value, a clock latency value, and a clock reconvergence pessimism removal (CRP) value.

17. The computer system of claim 16, wherein instructions for determining the timing adjustment value cause the computer processor to:

determine a worst case slack value for each load pin of the net from the plurality of sets of timing values;

determine an aggregate slack value for each load pin of the net from the plurality of sets of timing values;

determine the timing adjustment value as a difference between the worst case slack value for the net and the aggregate slack value for the net.

18. The computer system of claim 17, wherein the worst case slack value is determined based on a minimum of a sum of (1) the CRP value and (2) a difference of the data arrival value and the clock latency value determined for the plurality of sets of timing values.

19. The computer system of claim 17, wherein the aggregate slack value is determined based on a sum of (1) a minimum CRP value and (2) a difference of a maximum data arrival value and a minimum clock latency value determined across the plurality of sets of timing values.

20. The computer system of claim 17, wherein the worst case slack value is determined based on a minimum of the difference of data arrival value and clock latency value determined for each set of timing values.

* * * * *